United States Patent [19]

Hahn

[11] 4,427,635

[45] Jan. 24, 1984

[54] CHEMICAL OXYGEN GENERATOR

[75] Inventor: Rainer Hahn, Afrade, Fed. Rep. of Germany

[73] Assignee: Drägerwerk Aktiengesellschaft, Afrade, Fed. Rep. of Germany

[21] Appl. No.: 318,912

[22] Filed: Nov. 6, 1981

[30] Foreign Application Priority Data

Nov. 29, 1980 [DE] Fed. Rep. of Germany ....... 3045111

[51] Int. Cl.3 ....................... G05D 16/00; A62B 21/00; B01J 19/00

[52] U.S. Cl. .................................... 422/113; 422/120; 422/122; 422/126; 422/165; 422/166; 422/167

[58] Field of Search ............... 422/120, 122, 126, 165, 422/166, 167, 110, 112, 113

[56] References Cited

U.S. PATENT DOCUMENTS

| | | | |
|---|---|---|---|
| 2,558,756 | 7/1951 | Jackson et al. | 422/120 |
| 3,436,191 | 4/1969 | McGoff et al. | 422/120 X |
| 3,482,568 | 12/1969 | Borard | 422/120 X |
| 3,573,001 | 3/1971 | Borard | 422/120 |
| 3,591,343 | 7/1971 | McGoff et al. | 422/166 X |
| 4,111,661 | 9/1978 | Rothenberger | 422/165 X |
| 4,246,229 | 1/1981 | McBride et al. | 422/122 |
| 4,278,637 | 7/1981 | McBride | 422/122 |

FOREIGN PATENT DOCUMENTS

| | | | |
|---|---|---|---|
| 2037891 | 7/1980 | United Kingdom | 422/120 |

*Primary Examiner*—Barry S. Richman

*Attorney, Agent, or Firm*—McGlew and Tuttle

[57] ABSTRACT

A chemical oxygen generator is disclosed which includes a pressure vessel surrounding the container containing the chemical. In a space between the tank containing the chemical and the wall of the pressure vessel, a supply of pressurized oxygen is provided. A manually triggerable valve stem is operable to simultaneously open a passage from the pressurized supply and to initiate ignition of the chemical in the tank to generate a further supply of oxygen.

1 Claim, 1 Drawing Figure

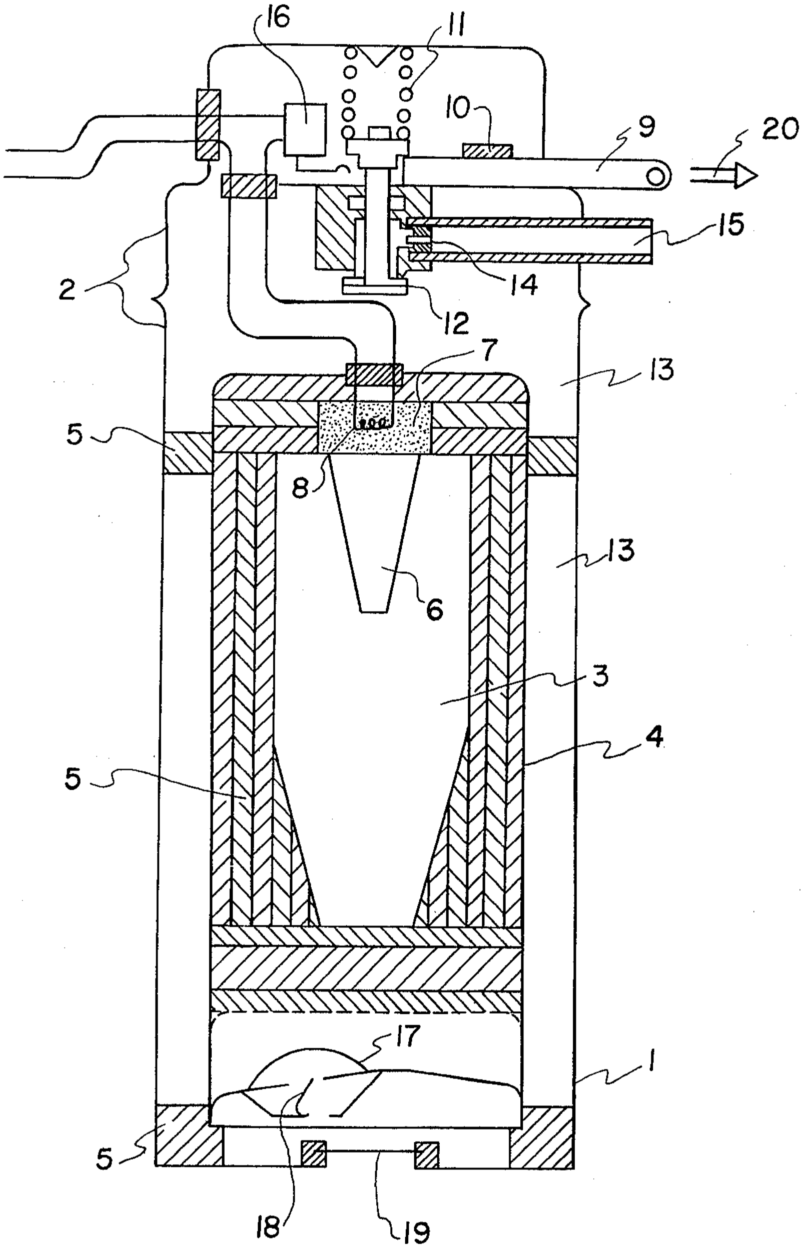
16
11
10
9
20
15
14
2
12
7
13
5
8
13
6
3
5
4
17
1
5
18
19

CHEMICAL OXYGEN GENERATOR

FIELD AND BACKGROUND OF THE INVENTION

The invention relates, in general, to a chemical oxygen generator and, more particularly, to a new and useful chemical oxygen generator of the type having a manually triggerable starting device.

Chemical oxygen generators are used in respirators to make a supply of oxygen available. The oxygen in chemical oxygen generators is typically present in a chemically bound state, such as in a chlorate candle or in a $KO_2$ cartridge, which is released, when needed, in the course of a chemical reaction. A starting device triggers the oxygen discharge by manual release. Several seconds are always lost before the oxygen discharges in the full amount required. This represents a difficulty for respirator applicators as a user cannot be immediately supplied with the required breathable gas.

A known oxygen generating call unit, housed in a dispensing apparatus, has a one-way tank such as of tin plate, with a cylindrical sidewall, a closed bottom face wall and an upper face wall broken by a central opening. The opening is tightly closed by a pierceable foil seal. An oxygen candle of compressed sodium or potassium chlorate, to which a sodium or potassium oxide is admixed, is retained in the tank by means of elastic fiber mats in such a manner that its flat sides are spaced from the tank wall so that flow paths for the developing oxygen remain. At the tip of the candle is an ignition cone, centered with respect to the opening in the upper tank face wall.

The dispensing apparatus in which the cell unit is accommodated, contains a concentrically encompassing cylindrical sidewall and one each perforated bottom and top wall. The latter has a shiftable thrust bolt and a cup-type lock spaced from the thrust bolt all around, with an oxygen discharge tube leading to the outside.

To activate the oxygen generator cell unit, the thrust bolt is pushed through the foil seal in the upper face wall of the cell tank, and a glass vial above the ignition cone is smashed. The ignition cone is activated, and it, in turn, then initiates burning of the oxygen candle. The oxygen then freed flows through the flow paths between the tank and the oxygen candle and through the cup-type lock into the oxygen discharge tube.

It is advantageous that the oxygen formed is not available the moment the chemical reaction is triggered. Several seconds (up to 10) always pass, and this applies also to the other known ignition system with primer or electrical incandescent wire, before the oxygen generator reaches its full rated output. Therefore, this known oxygen generator cell unit is not suited for applications where the oxygen is needed immediately, e.g. as emergency supply in aircraft or oxygen breathing apparatus carried on the user's body (see West German Auslegeschrift No. 26 20 300).

SUMMARY OF THE INVENTION

According to the invention, the empty space of a pressure vessel is already filled with pressurized oxygen during the readying time. Quantitatively, this suffices to supply the user with breathable gas from the first few seconds after starting the oxygen generator until the full amount of oxygen is supplied by the chemical reaction.

The filling of the empty space with pressurized oxygen, moreover, offers an additional safety against the penetration of moisture which would be harmful to the chemical substance.

Accordingly, it is an object of the invention to supply the user of a breathing apparatus in which the chemical oxygen generator is accommodated with a sufficient amount of a breathable gas, that is, one having an adequate oxygen content, from the start of use, that is, immediately after the actuation of the starting device.

Accordingly, it is an object of the invention to provide an improved chemical oxygen generator having a tank, a chemical in the tank containing oxygen in a chemically bound state, an ignition device operable to initiate a chemical reaction with the chemical to generate oxygen to be supplied to a user, and a trigger device connected to the ignition device for triggering the ignition device responsive to manual actuation. In accordance with the invention, the improved device includes a tightly closed pressure vessel enclosing a compartment containing the tank, a ceramic fiber fleece concentrically retaining the tank within the compartment of the pressure vessel to define a space therebetween for containing a supply of pressurized oxygen. The pressure vessel has an opening for passing oxygen from the space. A valve is provided between the space and the opening. The valve includes a stem movable between a closed position and an open position to close and open a passage between the space and the opening. Spring means are provided for resiliently urging the stem into the open position. A switch operated by a predetermined movement of the stem is provided to energize the ignition device. The trigger device includes a trigger pin releasably engaged to the stem for holding the stem in the closed position. The stem is operable, responsive to the manual release of the trigger pin to simultaneously move into the open position and engage the switch to trigger ignition.

In accordance with an advantageous feature of the invention, a dosing throttle is provided in the passage. In accordance with another advantageous feature of the invention, the pressure vessel includes a burst plate.

The inventive arrangement makes certain, with a simple design of the chemical oxygen generator and the supplementing earlier filling of the empty space between the conventional cartridge tanks and a pressure vessel with pressurized oxygen, that the user is supplied with oxygen until the chemical oxygen supply sets in. Due to the additional oxygen already available before, the user is supplied faultlessly also during the first few seconds until the chemical oxygen production sets in.

The dosing throttle assures a nearly constant amount of oxygen supply, eliminating the pressure difference after the start with the higher pressure in the empty space and then the normal oxygen supply from the chemical reaction.

The burst plate in the bottom of the pressure vessel represent in simple manner an overpressure safety in case of malfunctions of the outlet valve or dosing throttle.

It is a further object of the invention to provide an improved chemical oxygen generator which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawing and descriptive matter in which a preferred embodiment is illustrated.

BRIEF DESCRIPTION OF THE DRAWING

The sole FIGURE of the drawing is a schematic side representation of a chemical oxygen generator constructed in accordance with the invention, partly in section.

DETAILED DESCRIPTION

Referring to the drawing, in particular, the invention embodied therein comprises a chemical oxygen generator generally designated by reference numeral 1.

In a tightly closed pressure vessel 2, the chemical oxygen generator 1 contains an oxygen candle 3 in a conventional tank 4. The candle is supported concentrically in the tank 4, and the tank 4, in turn, in the pressure vessel 2 by ceramic fiber fleeces 5. At its top, the oxygen candle 3 contains an ignition cone 6. It is activated the starting powder 7 ignited by a trigger 8, such as an incandescent wire. The trigger 8 may also be, in known manner, a water ampule or a primer.

Starting is initiated by pulling a release pin 9 in the direction of arrow 20, thereby freeing a spring-loaded valve stem which is then pushed downwardly by a preloaded compression spring 11. This opens a valve 12 so that the pressurized oxygen, filled in before the readying, can flow from the empty space 13 between the pressure vessel 2 and the tank 4 through a dosing throttle 14 to the outlet 15.

Simultaneous with opening the valve 12, the valve stem actuates a switch 16 through which the incandescent wire of the trigger 8 is energized. Subsequently, the starting powder 7 and, via the ignition cone 6, the oxygen candle 3 are activated. When the pressure building up in tank 4 due to the oxygen forming from the oxygen candle 3 exceeds the decreasing pressure in the empty space 13, it bulges a diaphragm 17 outwardly, which, in the process, is cut open by a cutting point 18. The formed chemical oxygen flows through the empty space 13 and the open valve 12 to the outlet 15. Diaphragm 17 once cut, allows oxgyen to flow over a passageway adjacent point 18, from tank 4 to space 13.

A burst plate 19, provided in the pressure vessel 2, serves as an overpressure safety.

Thus, in accordance with the invention, there is provided a chemical oxygen generator in a tank with a manually triggerable starting device of known design, characterized in that the tank is mounted in a tightly closed pressure vessel and retained concentrically by ceramic fiber fleeces, so as to form an empty space therebetween, and that the starting device, through a pull-out trigger pin and a valve stem, simultaneously triggers the ignition by means of a trigger and opens a valve between the empty space and an outlet so that the pressurized oxygen filled into the empty space can discharge to supply the user. The chemical oxygen generator is advantageously characterized in that the outlet is preceded by a dosing throttle. The chemical oxygen generator is further advantageously characterized in that the bottom of the pressure vessel contains a burst plate.

While a specific embodiment of the invention has been shown and described in detail to illustrate the application of the principles of the invention, it will be understood that the invention may be embodied otherwise without departing from such principles.

What is claimed is:

1. In a chemical oxygen generator for an emergency breathing system having a tank, a chemical in the tank containing oxygen in a chemically bound state, an ignition device operable to initiate a chemical reaction with the chemical to generate oxygen to be supplied to a user, and a trigger device connected to the ignition device for triggering the ignition device responsive to manual actuation, the improvement comprising a tightly closed pressure vessel enclosing a compartment containing the tank, a ceramic fiber fleece concentrically retaining the tank within the compartment of said pressure vessel to define a space therebetween for containing a supply of pressurized oxygen, an original supply of pressurized oxygen provided in said pressure vessel before any ignition of said ignition means, said pressure vessel having an opening for passing oxygen from said space, a valve between said space and the opening, said valve including a stem movable between a closed position and an open position to close and open a passage between said space and said opening, spring means for resiliently urging said stem into said open position, a switch operated by a predetermined movement of said stem toward said open position to energize said ignition device, and wherein the trigger device includes a trigger pin releasably engaged to said stem for holding said stem in said closed position, said stem being operable responsive to the manual release of said trigger pin to simultaneously move into said open position and engage said switch to trigger ignition, and a dosing throttle in said passage for passing a constant flow of oxygen therethrough from said space, so that upon manual release of said trigger, said original supply of oxygen is provided over said dosing throttle before the chemically bound oxygen is generated and supplied over said throttle, a burst plate operatively mounted to said pressure vessel, said burst plate being operable to burst and relieve excess pressure from said space, said tank having a passageway communicating an interior of said tank with said space, a diaphragm over said passageway, a point connected to said tank and on a side of said diaphragm opposite an interior of said tank for containing the oxygen in a chemically bound state, so that when said original supply of oxygen is provided over said dosing throttle, and chemically bound oxygen generated in said tank, a pressure of the generated chemically bound oxygen pushes said diaphragm against said point to rupture said diaphragm and allow passage of the generated chemically bound oxygen over said passageway and to said space.

* * * * *